United States Patent [19]

Kistner et al.

[11] Patent Number: 4,491,497

[45] Date of Patent: Jan. 1, 1985

[54] HAND LABELING APPARATUS

[75] Inventors: Heinz Kistner, Neckarsteinach; Kurt Schrotz, Beerfelden, both of Fed. Rep. of Germany

[73] Assignee: Esselte Pendaflex Corporation, Garden City, N.Y.

[21] Appl. No.: 492,671

[22] Filed: May 9, 1983

[30] Foreign Application Priority Data

May 11, 1982 [DE] Fed. Rep. of Germany ....... 3217647

[51] Int. Cl.³ ............................................. B32B 31/00

[52] U.S. Cl. .................................. 156/384; 101/288; 101/292; 156/579; 156/DIG. 49

[58] Field of Search ............... 156/384, 577, 579, 584, 156/DIG. 48, DIG. 49; 101/288, 291, 292

[56] References Cited

U.S. PATENT DOCUMENTS 3,911,817 10/1975 Becker et al. ...................... 156/384

FOREIGN PATENT DOCUMENTS 2722302 12/1977 Fed. Rep. of Germany ...... 156/384

*Primary Examiner*—Jay H. Woo
*Assistant Examiner*—Timothy W. Heitbrink
*Attorney, Agent, or Firm*—Gerald J. Ferguson, Jr.; Joseph J. Baker

[57] ABSTRACT

The invention relates to a hand labeling apparatus for printing and applying adhesive labels on articles. The apparatus comprises a printer (21) held by a printer carrier (20) which is pivotable between an inoperative and an operative position. In the inoperative position the printer carrier (20) holds the printer (21) lifted off an adhesive label (11) lying on a printing platen (14), while in operative position it holds the printer (21) in contact with the adhesive label (11). By drive means (3, 30, 5) the printer carrier (20) can be moved from the inoperative into the operative position and can be automatically returned to the inoperative position under the influence of a resetting force. In order to prevent double imprints on the adhesive label the device includes retaining means (46, 60) which hold the printer carrier (20) in the operative position with a retaining force that is less strong than the resetting force.

14 Claims, 5 Drawing Figures

HAND LABELING APPARATUS

The invention relates to a hand labeling apparatus for printing and applying adhesive labels on articles, said apparatus comprising a printer held by a printer carrier which is pivotable from an inoperative position in which it holds the printer lifted off an adhesive label lying on a printing platen into an operative position in which it holds the printer in contact with the adhesive label, and a drive means for pivoting the printer carrier from the inoperative into the operative position and for automatically returning the printer carrier into the inoperative position under the influence of a resetting force.

Such an apparatus has been known from German patent application No. 2,722,302. In said known apparatus two springs are provided on either side of the printing platen to prevent double imprints on the adhesive labels; said springs are first contacted by the printer and then deformed on its way to the printing platen in order that the printer can finally strike against the adhesive label to be printed. Due to the violent contact and the elasticity of the printing types provided on the printer and of the surface of the printing platen the printer has the tendency after the first strike to rebound from the printing platen and strike it again. This might result in undesirable double imprints which, in the known labeler are to be prevented by the provision of the two springs which take care that after the first lift-off the printer is safely held in the lifted position and does not bounce back on the adhesive label. The springs used in the known labeler have the disadvantage of absorbing part of the energy with which the printer is moved toward the adhesive label to be printed. If said springs are made too strong, they absorb too much energy so that only a faint imprint is produced on the adhesive label while, if they are too weak, the force thereof is not sufficient to prevent the printer from striking the adhesive label two or more times. Therefore, the dimensioning of said springs is extraordinarily critical.

The invention has the object of designing a hand labeling apparatus of the initially defined type so that, with simple means requiring no narrow tolerances and leaving the movement of the printer towards the label to be printed nearly completely unaffected, any double imprints on the labels are safely prevented.

According to the invention this object is realized by a retaining means which retains the printer carrier in the operative position with a retaining force that is less strong than the resetting force.

The retaining means provided in the apparatus of the invention takes care that the printer, after having struck the adhesive label, is retained in contact with the label and cannot rebound due to the elasticity of the printing types and of the printing platen. This prevents any undesirable double imprints on the adhesive label which highly impair the produced imprint and which may even make it illegible, particularly if it is to be machine-readable. The printer lifts off again from the printed adhesive label only when the drive means returns the printer carrier to the inoperative position under the influence of the resetting force. Since the retaining force is less strong than the resetting force, the retaining means does not interfere with said return movement.

Advantageous modifications of the invention are characterized in the subclaims.

The invention will now be explained by way of example with reference to the drawing wherein FIG. 1 is a schematic lateral view of a hand labeling apparatus designed according to the invention in inoperative position;

Figure 1:
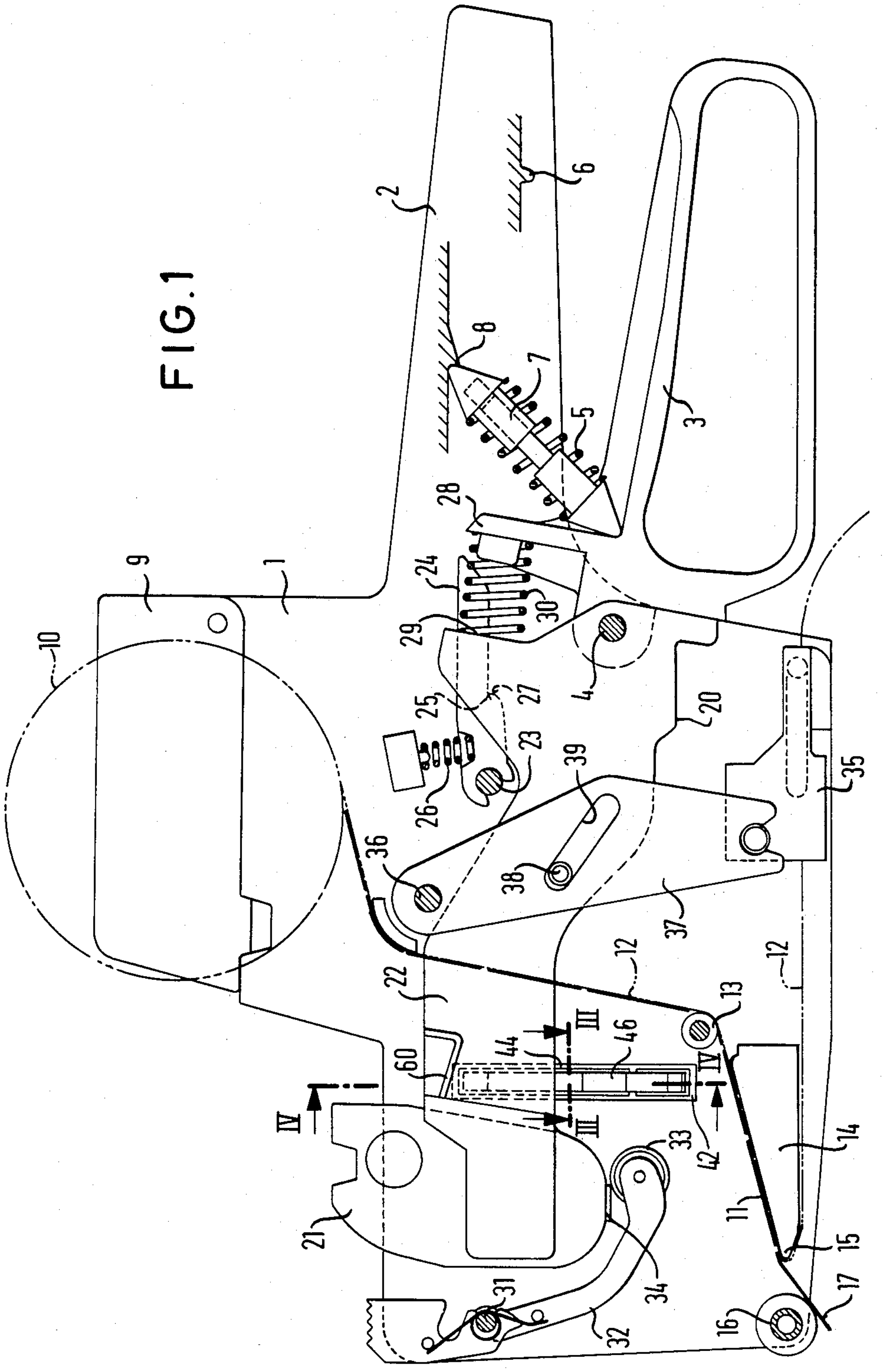

The hand labeling apparatus illustrated in FIG. 1 comprises a housing 1 with a grip 2. An operating lever 3 mounted for rotation about a shaft 4 can be drawn towards the grip 2 against the force of a spring 5 until it abuts against a stop 6 in the grip 2. In order to safeguard the spring 5 against lateral evasion on compression there is provided in the interior thereof a rod 7 made up of two parts telescopically slidable one in the other which is held between the operating lever 3 and a nose 8 in the grip 2.

In the upper side of the housing 1 there is a well 9 for receiving a supply roll 10 of carrier tape 12 carrying adhesive labels 11 on one side thereof. The carrier type 12 extends from the supply roll 10 downwardly within the apparatus to a deflecting roll 13 and then to a printing platen 14 whose front end shown on the left-hand side in FIG. 1 forms a peel edge 15 at which the adhesive labels 11 peel off by sharp deflection of the carrier tape 12 and arrive in dispensing position below an applicator roll 16. FIG. 1 shows an adhesive label 17 in dispensing position.

In the apparatus also a printer carrier 20 is mounted for rotation about the pin 4 which, at the front end shown on the left-hand side in FIG. 1, has two lateral arms holding between them a printer 21. In the lateral view of FIG. 1 only one lateral arm 22 of the printer carrier 20 is visible. The printer carrier 20 is held in the position illustrated in FIG. 1 by means of the pawl 24 pivotable about a pin 23. In order to achieve this retaining effect the pawl 24 has a step 25 which, by way of a spring 26 seated on one side in the housing 1, is held non-positively against a nose 27 at the printer carrier 20. At the operating lever 3 there is an arm 28 which, when the operating lever 3 is pulled towards the grip 2, abuts against the pawl 24 and turns it against the action of the spring 26 counterclockwise in the illustration of FIG. 1 so far that the step 25 and the nose 27 are disengaged. Between the arm 28 and an abutment surface 29 at the printer carrier 20 there is a compression spring 30.

Figure 2:
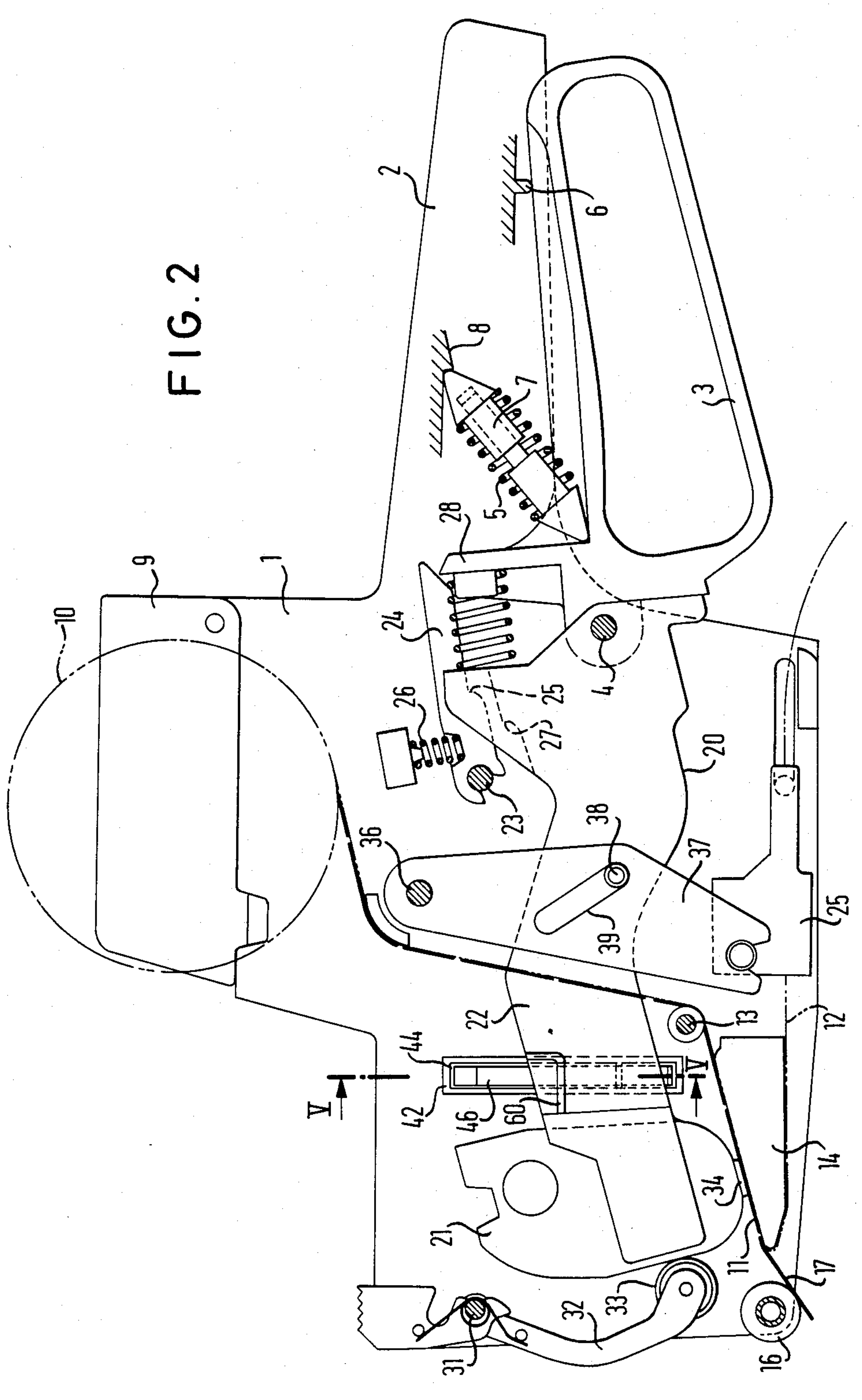
FIG. 2 is a schematic lateral view of the hand labeler of FIG. 1 in printing position.

At the forward end of the apparatus there is a rocker arm 32 carrying an inking roll 33 at its lower end. Said inking roll rolls over the printing types 34 provided on the printer 21 upon movement of the printer from the position shown in FIG. 1 into the position shown in FIG. 2 to thereby ink the types before each printing cycle.

A further component of the apparatus illustrated in FIG. 1 is a transporting unit 35 by which the carrier tape 12 can be advanced by a length corresponding to the length of one adhesive label 11 during each actuation cycle of the apparatus. This transporting unit 35 is moved by two pivoted levers 37 rotatable about a pin 36 only one of which is visible in FIG. 1. The pivoted levers 37 are controlled by way of pins 38 at the printer carrier 20 extending through slots 39 in the pivoted levers 37.

The transporting unit 35 is so designed that it can be moved from left to right along the carrier tape 12 in the view of FIG. 1; during this movement it is not in engagement with the carrier tape 12, while during movement in opposite direction it comes into engagement with the carrier tape 12 and carries it along a length corresponding to the length of one label.

Figure 3:
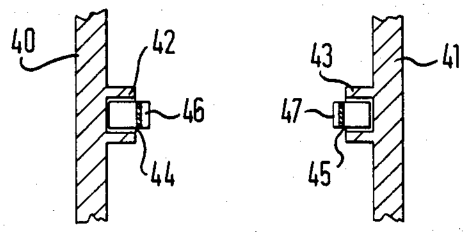
FIG. 3 shows a schematic section along the line A—A in FIG. 1.
Figure 4:
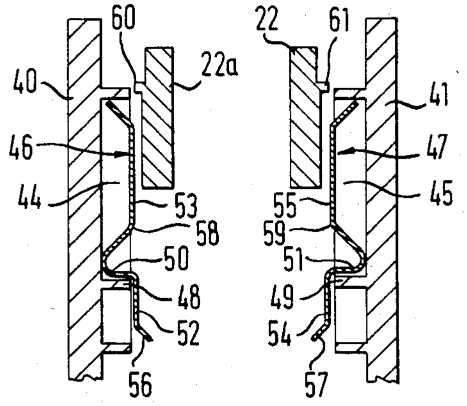
FIG. 4 shows a schematic section along the line B—B in FIG. 1.

In the inner faces of the side walls 40, 41 of the apparatus there is provided one chamber 44, 45 each defined by raised walls 42, 43. Each of these chambers 44, 45 accommodates a specially bent leaf spring 46, 47 the configuration of which may best be seen in the sectional view of FIG. 4. FIG. 3 shows that the width of the chambers 44, 45 corresponds approximately to the width of the leaf springs 46, 47, while FIG. 4 shows that the length of the chambers corresponds substantially to the length of the leaf springs. FIG. 4 also shows that in each of the chambers 44, 45 an intermediate web 48, 49 is provided which is in contact with an angular section 50, 51 of the leaf springs extending substantially at right angles to the general longitudinal extension thereof.

Each of the leaf springs 46 and 47 has two longitudinally extending sections 52, 53 and 54, 55, respectively, whose oppositely facing ends are bent in opposite directions. The ends of the longitudinal sections facing each other are connected by a bight which also includes the aforementioned angular sections 50, 51. The leaf springs 46, 47 are so arranged that expecially the transitions between the angular sections 50, 51 and the longitudinal sections 52, 54 rest on the intermediate webs 48, 49.

The mode of effect of the labeler whose construction has been described above, and especially the purpose of the leaf springs 46, 47 provided at the inner faces of the side walls 40, 41, will best be understood from an explanation of an actuation cycle of the apparatus. In the beginning of an actuating cycle there is no adhesive label in the position of the label 17; the foremost adhesive label is lying on the printing platen 17 to be printed by means of the printer 21.

For initiating an actuating cycle the operating lever 3 is pulled towards the grip 2 against the force of the spring 5. On account of the movement of the operating lever 3 about the pin 4 also the arm 28 moves toward the abutment 29 at the printer carrier 20 so that the spring 30 therebetween is compressed. Shortly before the operating lever 3 reaches the stop 6 in the grip 2 the arm 28 comes into engagement with the pawl 24 so that it pivots the latter about the pin 23 against the action of the spring 26. Such pivoting of the pawl 24 has the consequence that the step 25 in the pawl and the nose 27 at the printer carrier 20 are disengaged from each other so that the latter can rotate about its pin 4. Since at the moment of release of the printer carrier 20 the spring 30 is highly compressed, the printer carrier 20 is rapidly turned about the pin 4 with the consequence that the printer 21 is moved toward the printing platen 14 at high speed. On downward movement of the printer 21 from the position shown in FIG. 1 to that shown in FIG. 2 the inking roll 33 rolls over the front face of the printer 21 so that the printing types are inked and leave a well readable imprint on the adhesive label when striking it.

During the downward travel of the printer carrier 20 the pins 38 shift in the slots 39 of the pivoted levers 37 so that the latter move the transporting unit 35 out of the position of FIG. 1 along the carrier tape toward the printing platen 14. When the operating lever 3 is released it returns to its inoperative position shown in FIG. 1 under the action of the spring 5 thereby also lifting the printer carrier 20 into its starting position shown in FIG. 1. At the same time the transporting unit 35 is returned by the pivoted levers 37 to its starting position shown in FIG. 1, and during this movement it takes along the carrier tape and pulls it over the peel edge 15. There the just printed adhesive label 11 peels off the carrier tape 12 and arrives in the position of the label 17 shown in FIG. 1. In this position the adhesive label 17 is ready for application on an article. The application itself is effected in that the applicator roll 16 is rolled over the article.

Figure 5:
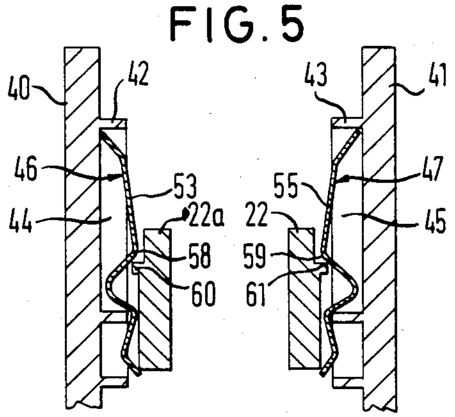
FIG. 5 shows a schematic section along the line C—C of FIG. 2.

When the printer carrier 20 moves the printer 21 towards the printing platen 14 under the action of the spring 30, the lateral arms 22 and 22*a* move out of the inoperative position shown in FIG. 4 along the springs 46 and 47 downwardly into the printing position shown in FIG. 5. Shortly before reaching said printing position the lateral arms 22 and 22*a* push against the inwardly bent ends 56, 57 of the longitudinally extending sections 52, 54. The sections 52, 50 and 54, 51 of the springs 46 and 47, respectively, are tilted about the intermediate webs 48, 49 acting as bearing points out of the position shown in FIG. 4 into the position shown in FIG. 5. The bends 58, 59 at the transition between the bights in the springs and the longitudinally extending sections 53 and 55 are lifted out of the chambers 44, 45 during this tilting motion so that they reach behind projections 60, 61 provided in the external side faces of the lateral arms 22 and 22*a*. By suitable dimensioning of the springs 46, 47 the printer carrier 20, and thus also the printer 21, can be safely held in contact with the adhesive label after having struck against said adhesive label 11 to print it, without bouncing off and striking it again, with the ensuing risk of producing a double imprint. Since the springs 46, 47 contact the lateral arms 22, 22*a* of the printer carrier 20 only just before the printing types 34 reach the adhesive label 11 to be printed, the energy transmitted by the spring 30 to the printer carrier is nearly completely utilized for the printing operation without being diminished by frictional forces between the springs 46, 47 and the lateral arms 22, 22*a*. Owing to the special configuration of the springs 46, 47 illustrated in FIGS. 4 and 5, the lifting motion of the printer carrier commencing after the printing operation by release of the operating lever 3 is not impaired to such an extent that the spring 5 providing the force required for the lifting motion must be made stronger. Nevertheless, the force of the springs 46, 47 is sufficient to safely hold the printing types 34 in contact with the label after they have struck the adhesive label 11.

We claim:

1. A hand labeling apparatus for printing and applying adhesive labels on articles including a printer held by a printer carrier which is pivotable from an inoperative position in which it holds the printer lifted off an adhesive label lying on a printing platen into an operative position in which it holds the printer in contact with the adhesive label, and a drive means for pivoting the printer carrier from the inoperative into the operative position and for automatically returning the printer carrier into the inoperative position under the influence of a resetting force, characterized by retaining means which retain the printer carrier in the operative position with a retaining force which prevents the printer from rebounding from the operative position and then again being returned to the operative position to thus avoid double imprinting of the adhesive label, said retaining force being less than the resetting force so that the printer carrier can be readily returned to its inoperative position.

2. Apparatus according to claim 1 characterized in that the retaining means include a retainer tiltable about a bearing point and having on one side of the bearing point a projection extending into the pivoting path of the printer carrier (20) and on the other side of the bearing point a retainer section which, on tilting of the retainer about the bearing point triggered by contact between the projection and the printer carrier comes into retaining engagement with the printer carrier.

3. Apparatus according to claim 2 characterized in that the retainer consists of at least one leaf spring accommodated in one side wall of the labeler and having at one end thereof a section bent out of its plane toward one side to form the projection, that said projecting section is followed by a first longitudinal section which extends parallel to the direction of movement of the printer carrier and is followed, in turn, by an angular section which is bent out of its plane in the other direction and, after forming a bight, merges into a second longitudinal section extending in the same plane as the first longitudinal section, and that the leaf spring is held in the side wall so that the transition from the first longitudinal section to the angular section rests on the bearing point.

4. Apparatus according to claim 3 characterized in that on the lateral face of the printer carrier facing the side wall of the labeler there is a projection with which the transition between the bight and the second longitudinal section of the leaf spring comes into retaining engagement when the leaf spring is tilted upon contact between the projection thereof and the printer carrier (20).

5. Apparatus according to any one of claim 3 characterized in that for accommodating the leaf spring there is provided in the labeler side wall a chamber surrounded by a web and subdivided by an intermediate web to form the bearing point.

6. Apparatus according to claim 5 characterized in that in each side wall of the labeler there is provided a chamber in which a leaf spring is accommodated.

7. A hand labeling apparatus for printing and applying adhesive labels on articles including a printer held by a printer carrier which is pivotable from an inoperative position in which it holds the printer lifted off an adhesive label lying on a printing platen into an operative position in which it holds the printer in contact with the adhesive label, and a drive means for pivoting the printer carrier from the inoperative into the operative position and for automatically returning the printer carrier into the inoperative position under the influence of a resetting force, characterized by retaining means which retain the printer carrier in the operative position with a retaining force that is less than the resetting force, said retaining force becoming effective only when the printer reaches the adhesive label.

8. A hand labeling apparatus as in claim 1 or 7 where said retaining means includes a retainer tiltable about a bearing point, said retainer on tilting about the bearing point comes into retaining engagement with the printer carrier, said tilting being triggered by contact between the retainer and the printer carrier.

9. Apparatus according to claim 8 wherein said retainer has on one side of the bearing point a projection extending into the pivot path of the printer carrier and on the other side of the bearing point a retainer section, said tilting being triggered by contact between said projection and the printer carrier.

10. A hand labeling apparatus for printing and applying adhesive labels on articles including a printer held by a printer carrier which is pivotable from an inoperative position in which it holds the printer lifted off an adhesive label lying on a printing platen into an operative position in which it holds the printer in contact with the adhesive label, and a drive means for pivoting the printer carrier from the inoperative into the operative position and for automatically returning the printer carrier into the inoperative position under the influence of a resetting force, characterized by retaining means which retain the printer carrier in the operative position with a retaining force that is less than the resetting force, said retaining means include a retainer tiltable about a bearing point and having on one side of the bearing point a projection extending into the pivoting path of the printer carrier and one the other side of the bearing point a retainer section which, on tilting of the retainer about the bearing point triggered by contact between the projection and the printer carrier comes into retaining engagement with the printer carrier.

11. Apparatus according to claim 10 characterized in that the retainer consists of at least one leaf spring accommodated in one side wall of the labeler and having at one end thereof a section bent out of its plane toward one side to form the projection, that said projecting section is followed by a first longitudinal section which extends parallel to the direction of movement of the printer carrier and is followed, in turn, by an angular section whch is bent out of its plane in the other direction and, after forming a bight, merges into a second longitudinal section extending in the same plane as the first longitudinal section, and that the leaf spring (46, 47) is held in the side wall so that the transition from the first longitudinal section to the angular section rests on the bearing point.

12. Apparatus according to claim 11 characterized in that on the lateral face of the printer carrier facing the side wall of the labeler there is a projection with which the transition between the bight and the second longitudinal section of the leaf spring comes into retaining engagement when the leaf spring is tilted upon contact between the projection thereof and the printer carrier.

13. Apparatus according to any one of claims 11 or 12 characterized in that for accommodating the leaf spring there is provided in the labeler side wall a chamber surrounded by a web and subdivided by an intermediate web to form a bearing point.

14. Apparatus according to claim 13 characterized in that each side wall of the labeler there is provided a chamber in which a leaf spring is accommodated.

* * * * *